June 23, 1970  J. R. WHINNERY  3,516,731
BEAM FOCUSING BY ACOUSTIC WAVES
Filed May 27, 1968  2 Sheets-Sheet 2
FIG. 3
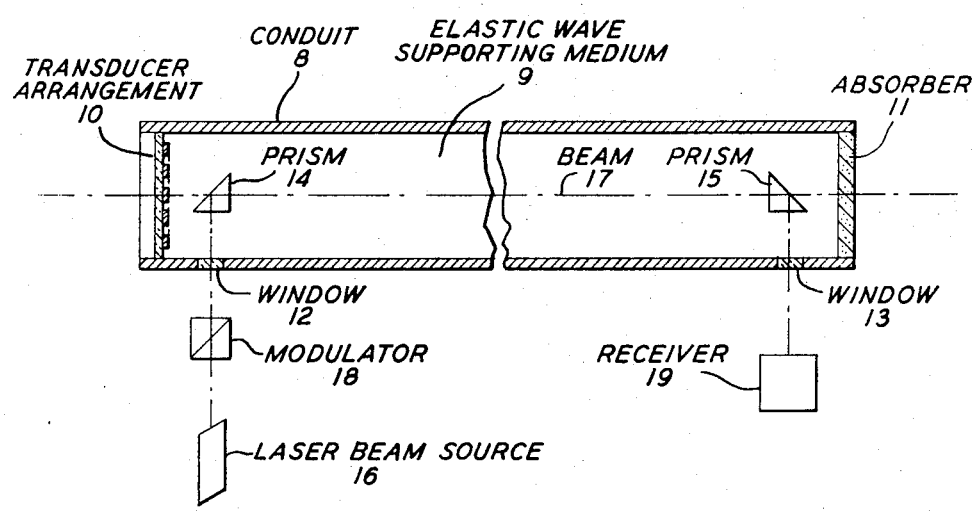
FIG. 5
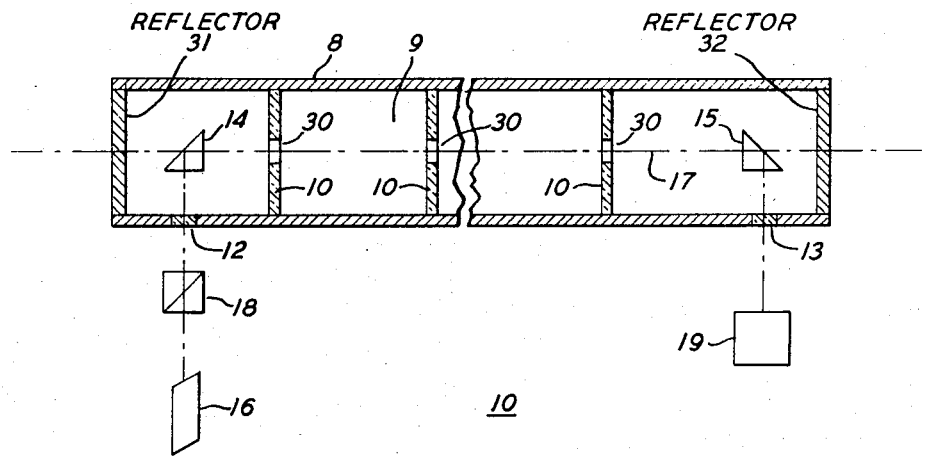
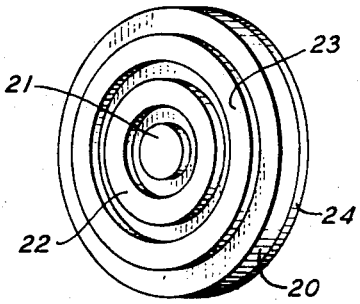
FIG. 4

United States Patent Office 3,516,731
Patented June 23, 1970

3,516,731
BEAM FOCUSING BY ACOUSTIC WAVES
John R. Whinnery, Orinda, Calif., assignor to Bell Telephone Laboratories, Incorporated, Murray Hill and Berkeley Heights, N.J., a corporation of New York
Continuation-in-part of application Ser. No. 384,510, July 22, 1964. This application May 27, 1968, Ser. No. 732,239
Int. Cl. G02f 1/28; G02b 1/06
U.S. Cl. 350—179
4 Claims

ABSTRACT OF THE DISCLOSURE

This application discloses an arrangement for focusing a beam of high frequency electromagnetic wave energy within a conduit for long-distance transmission. More specifically, an elastic wave in a circularly symmetric mode is established in a transparent elastic wave supporting medium within the conduit to guide the beam by alternate gradient focusing. Arrangements using traveling waves and standing waves are described in detail.

CROSS REFERENCE TO RELATED APPLICATION

This application is a continuation-in-part of the now abandoned copending application Ser. No. 384,510, filed July 22, 1964, by J. R. Whinnery.

BACKGROUND OF THE INVENTION

This invention relates to the transmission of electromagnetic wave energy, including light and adjacent energy bands, over long distances. More specifically, it relates to the focusing of such beams in a conduit to guide the beam around curves and to prevent scattering and beam spreading.

Many arrangements for utilizing and transmitting intense and highly directive beams of substantially coherent, very high frequency electromagnetic wave energy, principally in the visible light and adjacent frequency bands, have been devised during the last several years. See, for example, U.S. Pats. 3,390,932; 3,399,942; 3,400,993; 3,410,627; 3,413,059; and 3,415,588, all assigned to applicant's assignee.

Because of the extremely high frequencies of such waves and the wide frequency range over which they are operative, they give promise of vastly extended ranges of frequencies available for the transmission of intelligence such as speech, video, and the like.

Notwithstanding the fact that lasers are capable of producing extremely narrow, highly directive, substantially coherent energy beams, the unguided transmission of even these narrow beams over substantial distances would be accompanied by a very appreciable spreading of the beam, resulting in a large diminution of the energy received at a distant point. Beam spreading also involves the possibility that the wave energy may be intercepted by other stations as well as by the intended receiving station.

Generally, it is advantageous that an optical beam be transmitted through an enclosing pipe or conduit. In such an arrangement, a gas, or other transparent medium can then be employed to fill the conduit, thus providing a medium of controllable uniform and stable characteristics. This avoids the well known unfavorable effects of transmission through the atmosphere, such as those resulting from rain, snow, sleet, fog, temperature variation and the like. In addition, if the pipe or conduit is also opaque to the transmitted energy, such a system eliminates all possibility of interception of the beam by unauthorized receiving stations, thus assuring the preservation of complete privacy of communication.

If, however, the enclosing conduit is curved, the beam will eventually impinge upon the conduit wall and be reflected. Such reflections produce serious attenuation and distortion of the transmitted signals. Even if the conduit is perfectly straight, the above-mentioned beam spreading, if uncontrolled, would result in multiple reflections of the spreading rays by the conduit walls. Thus, it is apparent that some means for guiding the beam and substantially eliminating beam spreading is necessary even where transmission is through an enclosing conduit.

BRIEF SUMMARY OF THE INVENTION

In accordance with the present invention, electromagnetic beam guidance by means of elastic waves is obtained by establishing an elastic wave, of a suitable mode, in a transparent elastic medium contained within the conduit through which the beam is to be transmitted. In particular, a longitudinal elastic wave in a mode which is circularly symmetric with respect to the longitudinal axis of a cylindrical conduit is used. It has been determined that when such an elastic wave propagates through the transparent medium, regions of compression and rarefaction change the index of refraction of the medium in a periodic manner. These periodic variations in the medium produce a system of alternate converging and diverging lenses which produce a net focusing effect, as explained in the above-mentioned application by D. W. Berreman and S. E. Miller.

BRIEF DESCRIPTION OF THE DRAWINGS

The invention and its objects and advantages will be more clearly understood from the following detailed description taken in conjunction with the drawings in which:

FIG. 3 illustrates diagrammatically a first embodiment of the invention which utilizes a traveling elastic wave to guide an electromagnetic beam;

FIG. 4 illustrates a transducer arrangement useful in connection with the embodiment of FIG. 3; and FIG. 5 illustrates a second embodiment of the invention which utilizes a standing acoustic wave.

Figure 1A:
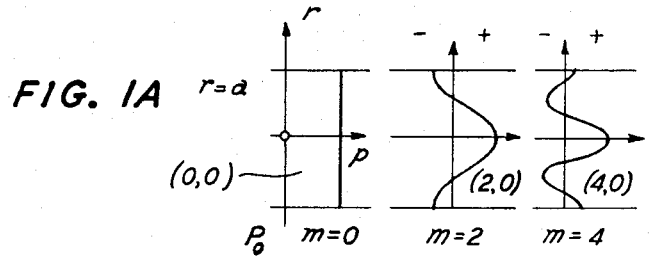
FIGS. 1A and 1B illustrate the radial pressure distributions of several elastic wave modes useful for guiding a beam in accordance with the invention.

Identical structural features appearing in the figures of the drawing will be given corresponding identification numerals, and each feature will be described in detail in connection with the structure of the first figure in which it appears.

DETAILED DESCRIPTION

As is well known, the pressure distribution in a circular conduit with rigid walls for a circularly symmetric elastic wave mode, having $m$ half-cycle variations in the radial direction, is given by the relation:

$$P = A J_o \frac{J_{1m}r}{a} \exp(-ik_{om}Z) \exp(i\omega t) \quad (1)$$

where:

A is a constant;
$J_o$ is a Bessel function;
$J_{1m}$ is the $m$th root of the Bessel function $J_1(X)=0$;
$a$ is the conduit radius;
$r$ is the radial displacement from the conduit axis;
$Z$ is the distance along the longitudinal direction;
$k_{om}$ is the mode propagation constant; and
$\omega$ is the angular frequency of the elastic wave disturbance.

Similarly, the pressure distribution for the case of an elastic-walled conduit is given by:

$$P = A J_o \frac{J_{om}r}{a} \exp(-ik_{om}Z) \exp(i\omega t) \quad (2)$$

Figure 1B:
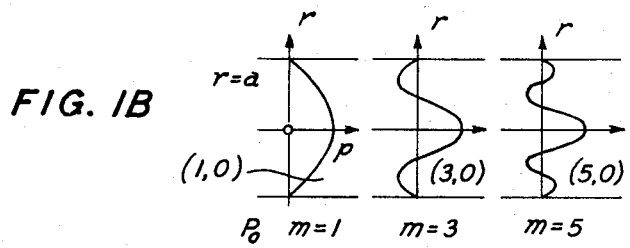

Referring to the drawings, FIGS. 1A and 1B illustrate the instantaneous transverse pressure distributions across a circular conduit for several of the lower order elastic modes. FIG. 1A illustrates pressure distributions for the (0,0), (2,0) and (4,0) modes in a conduit with rigid walls, and FIG. 1B illustrates the distributions of the (1,0), (3,0) and (5,0) modes in a conduit with elastic walls. (Modes are typically given the designation $(m, n)$ where $m$ denotes that number of half-cycle variations in the radial direction and $n$ denotes the number of half-cycle variations in a 360° rotation.) The radial distance from the conduit axis is plotted in the vertical direction and the pressure in excess of the mean conduit pressure, $P_o$, is plotted in the horizontal direction. More specifically, points to the right of the vertical axes indicate pressures in excess of $P_o$ and points to the left indicate pressures less than $P_o$. From Equations 1 and 2, it can be shown that the pressure distribution of all modes except the (0,0) mode of FIG. 1A are approximately parabolic near the conduit axis and, as will be explained hereinbelow, is the portion of the elastic wave primarily used for beam guidance.

Figure 2:
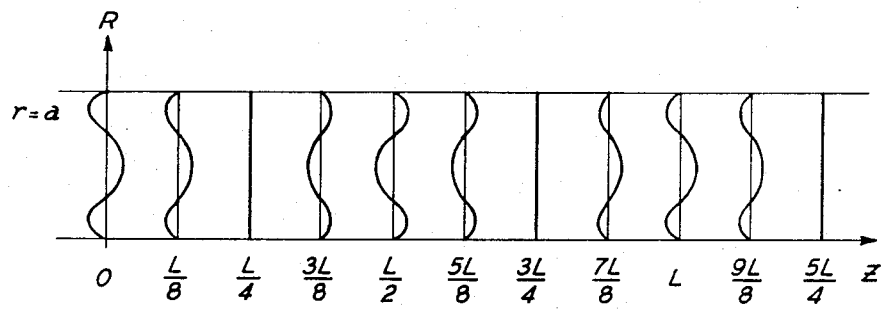
FIG. 2 illustrates the longitudinal variation in the pressure distribution of a typical elastic wave mode.

As can also be seen from Equations 1 and 2, the pressure also varies sinusoidally in the longitudinal, or Z, direction. FIG. 2 illustrates this variation for the (2, 0) mode. More specifically, it shows the instantaneous pressure distributions at several one-eighth wavelength intervals along the Z direction. The combination of this sinusoidal longitudinal variation and the approximately parabolic radial variation about the axis tends to produce the equivalent of a series of alternate converging and diverging lenses in the region near the conduit axis. For example, the half-wavelength portion of (2, 0) mode represented in FIG. 2 between 3L/4 and 5L/4 corresponds to a converging lens because the pressure (hence, density) decreases with increasing radius near the axis. The half-wavelength portion between L/4 and 3L/4, on the other hand, corresponds to a diverging lens because the pressure increases with increasing radius.

The effect of an elastic mode on a beam of electromagnetic energy simultaneously passing through the conduit can be readily calculated. It can be shown, for example, that a single wavelength section of a guided elastic mode (corresponding, for example, to the portion of the (2, 0) mode represented in FIG. 2 between L/4 and 5L/4) with circular symmetry ($n=0$) and $m$ radial variations, behaves as a pair of lenses, one diverging and one converging, each having a focal length, F, approximately given by the relation:

$$F = \frac{2\pi a^2}{nDJ_{1m}^2 L} \quad (3)$$

where:

$a$ is the conduit radius;
$n$ is the index of refraction at the static pressure used;
L is the guide wavelength of the acoustic mode;
D is the maximum fractional change in the index of refraction produced by the sound wave; and
$J_{1m}$ is the $m$th zero of the first order Bessel function.

Once the focal length of a half-wave portion of the acoustic mode is calculated, the effect of the mode in guiding a beam around curves in the conduit can also be readily calculated. In particular, the radial displacement, $r$, of a beam transmitted through a series of alternate converging and diverging lenses in a curved conduit is given by the relation, $$r = \frac{4F^2}{R}\left(1 + \frac{S}{4F}\right) \quad (4)$$

where F is the focal length of a single lens; R is the radius of curvature of the longitudinal axis of the conduit; and S is the interval between successive lenses. Where F is much greater than S, as is the case for acoustic waves, r is approximately $4F^2/R$.

FIG. 3 illustrates a specific arrangement of the invention comprising an elongated hollow conduit 8 filled with a transparent elastic wave supporting medium 9. A transducer arrangement 10, adopted to launch an acoustic wave of a predetermined mode in medium 9 along the longitudinal axis of the conduit 8, is located at one end of the conduit. The other end of the conduit is terminated by means of an elastic wave energy absorbing material 11 which absorbs any elastic wave energy that reaches it. At opposite ends of conduit 8 are windows 12 and 13, such as polished, plane windows of high quality optical glass, for permitting the entry and exit of a high frequency electromagnetic beam 17. Additional means, such as right angle prisms 14 and 15, are also included in conduit 8 for directing beam 17, entering through window 12, onto the axis of the conduit, and from the axis, at the output end, out through window 13. For purposes of illustration, the source of beam 17 is identified as a laser. In addition, a modulator 18, such as an electrooptic cell, is located along the beam path. At the output end of conduit 8, beam 17 is directed into a receiver 19.

Conduit 8, which surrounds and protects medium 9, is proportioned and designed to permit the transmission of both beam 17 and the elastic wave. More specifically, the hollow conduit has an internal transverse cross section which is sufficiently larger than both the wavelength of the electromagnetic energy to be transmitted therethrough and the cross section of the beam so that there is no significant interaction between the conduit and the transmitted beam. In addition, conduit 8 is suitable for guiding along its longitudinal axis an acoustic wave in a suitable propagating mode. Thus, the conduit has a relatively uniform internal cross section of simple geometry, such as a circular cross section; is relatively straight; and is usually relatively free of discontinuities. Moreover, the walls of the conduit are constructed to satisfy the appropriate boundary conditions for the particular elastic mode to be employed. For modes having an even number of half-cycle radial variations, i.e., the (2, 0), (4, 0), (6, 0) . . . modes, the conduit walls are sufficiently rigid to prevent significant radial vibration. For odd modes, i.e., the (1, 0), (3, 0), (5, 0) . . . modes, an elastic lining which can exert only negligible pressure on the fluid, such as rubber, is placed on the inner surface of the conduit.

Elastic wave supporting medium 10 can be a transparent gas, liquid or solid. As can be seen by Equation 3, however, the greater the index of refraction and the greater the variation of the index of refraction with pressure, the greater is the focusing effect. For gases, typical focal lengths range from about 100 meters for air at atmospheric pressure, to about 1 meter for gases having high molecular polarizabilities, such as hydrogen iodide, silicon tetrafluoride and benzene vapor, at 100 atmospheres. (These focal lengths are calculated for a circular conduit having a 5 cm. radius and elastic waves having guide wavelength of about 10 cm.) As can be readily seen from Equation 2, an elastic mode having a focal length of one meter will typically guide a beam around a radius curvature of 200 meters with a drift of 2 cm.

In order to minimize the amount of elastic power lost due to viscosity and heating at the conduit wall, the gas is advantageously one which has a low viscosity and is maintained at a high pressure. More specifically, it can be shown that the attenuation, $\alpha$, of an axially symmetric acoustic mode is approximately given by the relations $$\alpha = \frac{2.32}{a}\left(\frac{Vf}{d}\right)^{1/2} \text{ nepers/cm.} \quad (5)$$

where:

a is the radius of the conduit in cm.;

V is the coefficient of viscosity of the supporting medium in dyne cm./sec.;

f is the frequency of the acoustic wave in c.p.s.; and d is the average density of the medium in gm./cm.$^3$.

This relation yields an attenuation of the order of $10^{-5}$ nepers/cm. for a gas with a coefficient of viscosity on the order of $10^{-4}$ at 100 atmospheres pressure. This attenuation corresponds to a half amplitude loss in a few hundred meters.

Medium 9 can also be a transparent liquid or solid. In general, liquids and solids have considerably smaller focal lengths than gases, but scattering losses of the electromagnetic beam limit useful transmission lengths to a few kilometers. In a typical liquid medium, for example, focal lengths will be of the order of a few centimeters, and the scattering losses of the electromagnetic beam will be of the order of $10^{-4}$ nepers/cm.

Transducer arrangement 10 is designed to launch an acoustic wave of a predetermined mode along the longitudinal axis of conduit 8. As is known in the art, an acoustic mode is excited in a guiding structure by producing a transverse pressure distribution approximating that of the mode. (See for example, Hartig and Swanson, Transverse Acoustic Waves in Rigid Tubes, 54 Phys. Rev. 618, 1938.) Since circularly symmetric modes are especially advantageous for guiding a high frequency beam, arrangement 10 can, as is shown in FIG. 4, comprise a common circular transducer body 20, a common electrode 24 on one side, and a plurality of electrodes on the other side including a circular electrode 21 and a series of annular electrodes 22 and 23 concentric with the axis of the conduit. Each electrode is separately driven by a voltage of sufficient amplitude to produce a pressure approximately proportional to the pressure of the predetermined mode at the radius of the ring. By using a number of such transducers, properly phased, the pressure distribution of the mode can be closely approximated. The frequency of the driving voltage is above the cutoff frequency of the desired mode but (advantageously, lower than the cutoff frequency of the next higher mode. The phase of each ring is either 0° or 180°, depending on whether the mode pressure at the radius of the ring in the instantaneous pressure distribution of FIG. 1 exceeds or is less than $P_0$. The transducer driving source (not shown) can achieve the various amplitudes and phases through the use of a voltage divider network and phase shifters in accordance with principles well known in the art. Alternatively, a single circular transducer with a thickness which is varied as a function of the radial distance from the conduit axis can be used to reproduce the parabolic pressure distribution near the axis. A plurality of concentric ring-like transducers of variable thickness, one for each variation of phase, can then be used to reproduce the remainder of the mode distribution. Since the pressure amplitude is a function of the thickness of the transducer, control over the thickness permits control over the pressure distribution.

Whatever the structural details, transducer arrangement 10 is advantageously designed to launch only the desired propagating mode along the conduit axis. Since different modes propagate with different phase velocities, the launching of more than one mode would have an adverse effect on the alternate gradient focusing, and would disturb the periodic pattern of compressions and rarefactions.

As previously indicated, the greater the curvature of the conduit the greater is the focusing effect required. A variety of approaches can be used to increase the focusing effect. For relatively straight conduits, gas at moderate pressures can be used as the supporting medium; for radii of a few hundred meters, higher pressure gases must be used; and for radii less than a hundred meters, liquids or solids are preferred. As can be seen from Equation 3, decreasing the radius $a$ of the conduit will also decrease the focal length. However, since the use of a smaller radius results in a lower cut-off elastic wave frequency, there is a minimum limit to the radius which is of practical use. Since the focal length is inversely proportional to the elastic wave guide wavelength, L, operation near the cut-off also increases the focusing effect. In addition, the use of higher order elastic modes will increase the focusing effect because, as may be noted from FIG. 1, the higher the order the mode, the greater is the pressure gradient near the conduit axis. This effect is reflected in Equation 3 by the greater value of $J_{1m}$ for higher order modes than for lower order modes.

One phenomenon which limits the useful transmission lengths which can be obtained using the arrangement of FIG. 3 is the nonlinear effect in sound propagation which eventually causes the propagating elastic wave to degenerate into a "saw tooth" shock wave. (See J. B. Keller, Finite Amplitude Sound Waves, 25 J. Acoust. Soc. Am. 212, March 1953.) Thus, for longer transmission lengths, the arrangement of FIG. 5, which shows an alternative embodiment of the invention using standing elastic waves, is advantageous. The arrangement of FIG. 5 is substantially identical to that of FIG. 3 except that a plurality of transducer arrangements 10, adapted to permit transmission of beam 17, are located at periodic intervals along the conduit. The arrangements can be adapted to permit beam transmission by the use of transparent piezoelectric crystals, such as X-cut crystalline quartz, and transparent electrodes, such as tin oxide ($SnO_2$). In addition, elastic wave reflecting members 31 and 32 are placed at each end of the conduit to assist in establishing standing waves in the end sections. Each transducer arrangement excites the adjacent chambers on either side. The spacings and phase relations between consecutive transducer arrangements 10, and the spacings between the first and last arrangements and the reflecting end members, are chosen so as to establish standing elastic waves. In particular, successive arrangements are either spaced an integral number of wavelengths apart and driven 180° out of phase or spaced apart an odd number of half-wavelengths and driven in phase. In other respects, the remainder of the arrangement is the same as that described in FIG. 3.

The operation of this arrangement is substantially identical to that described in FIG. 3, except that a standing elastic wave rather than a traveling elastic wave is used to focus the beam. Because of the large difference between the velocity of sound and that of light, the effects of the two types of elastic waves are practically the same.

In all cases it is understood that the above-described arrangements are illustrative of only one of the many possible specific embodiments which can represent application of the principles of the present invention. Numerous and varied other arrangements can be readily devised in accordance with these principles by those skilled in the art without departing from the spirit and scope of the invention.

What is claimed is:

1. A guiding structure for transmitting a beam of electromagnetic wave energy comprising:

a hollow, elongated conduit having transverse cross-sectional dimensions sufficiently larger than the wavelength of said electromagnetic energy to avoid interaction with said beam;

an elastic wave supporting medium, transparent to said beam, disposed within said conduit;

means for establishing in said medium an elastic wave in a circularly symmetric mode characterized by pressure maxima and minima along the longitudinal axis of said conduit and an approximately parabolic pressure variation in the radial direction;

means for introducing said electromagnetic beam along said longitudinal axis;

and means for extracting said beam from said conduit.

2. A guiding structure according to claim 1 wherein said elastic wave launching means launches substantially only one elastic mode.

3. A guiding structure according to claim 1 wherein said elastic wave is a traveling elastic wave.

4. A guiding structure according to claim 1 wherein said elastic wave is a standing elastic wave.

References Cited

UNITED STATES PATENTS 3,297,876  1/1967  De Maria _____ 350—161 X

JOHN K. CORBIN, Primary Examiner

U.S. Cl. X.R.

350—161